US008649790B2

(12) United States Patent
Kazmi (10) Patent No.: US 8,649,790 B2
(45) Date of Patent: Feb. 11, 2014

(54) METHOD AND ARRANGEMENT FOR HANDOVER OR CELL RESELECTION EVALUATION

(75) Inventor: Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 494 days.

(21) Appl. No.: 12/989,697

(22) PCT Filed: Mar. 31, 2009

(86) PCT No.: PCT/SE2009/050335
§ 371 (c)(1),
(2), (4) Date: Oct. 26, 2010

(87) PCT Pub. No.: WO2009/134191
PCT Pub. Date: Nov. 5, 2009

(65) Prior Publication Data
US 2011/0045833 A1 Feb. 24, 2011

Related U.S. Application Data

(60) Provisional application No. 61/048,820, filed on Apr. 29, 2008.

(51) Int. Cl.
*H04W 36/32* (2009.01)

(52) U.S. Cl.
USPC ........... 455/441; 455/436; 455/438; 370/331; 370/332

(58) Field of Classification Search
USPC ................... 445/436, 437, 438, 441; 370/331
See application file for complete search history.

(56) References Cited

U.S. PATENT DOCUMENTS

| 8,320,918 | B2* | 11/2012 | Lee et al. ............... 455/441 |
| 2005/0128969 | A1* | 6/2005 | Lee et al. ............... 370/313 |
| 2006/0199591 | A1* | 9/2006 | Klatt ....................... 455/450 |
| 2007/0224994 | A1* | 9/2007 | Kakishima et al. ....... 455/436 |
| 2008/0056212 | A1 | 3/2008 | Karaoguz et al. |
| 2008/0119209 | A1* | 5/2008 | Upp ........................ 455/458 |
| 2008/0200171 | A1* | 8/2008 | Jeong et al. ............. 455/436 |
| 2009/0247161 | A1* | 10/2009 | Pani et al. ............ 455/435.3 |
| 2011/0263274 | A1* | 10/2011 | Fox et al. .............. 455/456.2 |

FOREIGN PATENT DOCUMENTS

EP 0631451 A2 12/1994
WO 2007/088381 A1 8/2007

* cited by examiner

*Primary Examiner* — Allahyar Kasraian
(74) *Attorney, Agent, or Firm* — Coats & Bennett, PLLC (57) ABSTRACT

A method in a base station for configuring a wireless terminal for performing a cell reselection or handover evaluation process "evaluation process" is provided. The wireless terminal is arranged to perform multiple evaluation processes parallel to each other, which multiple evaluation processes are governed by different set of mobility parameters. The base station determines (302) whether or not the multiple parallel evaluation processes, shall be used by the wireless terminal, based on the result of an establishment (301) of the mobility state, such as movement speed, of the wireless terminal. The base station signals (306) an identifier to the wireless terminal (110), which identifier identifies the determined whether or not the multiple parallel evaluation processes shall be configured to be used by the wireless terminal for evaluating cell reselection or handover.

26 Claims, 3 Drawing Sheets

METHOD AND ARRANGEMENT FOR HANDOVER OR CELL RESELECTION EVALUATION

TECHNICAL FIELD

The present invention relates to a method and an arrangement in a radio network node and a method and an arrangement in a wireless terminal. In particular, it relates to determining a cell reselection or handover evaluation process.

BACKGROUND

In a typical cellular radio system, also referred to as a wireless communication system, wireless terminals, also known as mobile stations and/or User Equipment units (UEs) communicate via a Radio Access Network (RAN) to one or more core networks. The wireless terminals may be mobile stations or user equipment units such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies.

In mobile communications, a wireless terminal can operate in several modes, such as connected mode and idle mode, for example. Moreover, as a wireless terminal travels through a radio access network, the wireless terminal is served by different cells in the course of the travel. That is, as a wireless terminal travels through the radio access network, the wireless terminal is typically handed over, e.g., from one cell to another cell, through a procedure such as a comprehensive cell reselection (when in idle mode) and handover procedures (when in connected mode). This involves large number of "mobility parameters", which should be properly tuned and optimized to ensure robust mobility performance.

Typically the mobility parameters are configured for 'normal' level of user speed. However mobile operators are increasingly deploying networks in wide range of scenarios, where user equipment unit, e.g., wireless terminal, speed may vary considerably. It is therefore important that the desired mobility performance be maintained in different scenarios while user equipment unit (UE) and network complexity is kept within acceptable limit.

Downlink Measurements for Mobility

User equipment unit mobility primarily relies, in both idle and connected modes, on downlink measurements. Downlink measurements used in various systems are described below:

In WCDMA the following three downlink radio related measurements are specified primarily for mobility reasons:

(1) Common Pilot CHannel Received Signal Code Power (CPICH RSCP);

(2) CPICH Ec/No, this is basically the signal-to-noise ratio used for representing the "cell quality" for handover evaluation;

(3) UTRA Carrier Received Signal Strength Indicator (RSSI).

The first two of the above measurements are performed by the user equipment unit on cell level basis on the Common Pilot CHannel (CPICH). The UTRA carrier RSSI is measured over the entire carrier. The above CPICH measurements are the main quantities used for the mobility decisions. In addition, in WCDMA several timing related measurements are also specified for connected mode mobility procedure. They are used to adjust the user equipment timing when performing handover in connected mode.

In E-UTRAN the following three downlink quality measurements are specified primarily for mobility reasons:

(1) Reference Symbol Received Power (RSRP);

(2) Reference Symbol Received Quality (RSRQ);

(3) E-UTRA Carrier RSSI.

The first two of the above measurements are performed by the user equipment on cell level basis on reference symbols. As in case of WCDMA, the E-UTRA carrier RSSI is measured over the entire carrier. The two RS based measurements are indeed also the main quantities, which are likely to be used for the mobility decisions.

Mobility Scenarios

As alluded to above, there are basically two kinds of mobility: (1) Idle mode mobility, which employs or works in conjunction with a cell reselection procedure; and (2) Connected mode mobility, which employs or works in conjunction with a handover procedure. In both idle and connected modes the mobility decisions are mainly based on the same kind of downlink measurements as discussed above.

Both WCDMA and E-UTRAN are frequency reuse-1 systems. This means the geographically closest neighbour cells operate on the same carrier frequency. An operator may also deploy multiple frequency layers within the same coverage area. Therefore, idle mode and connected mode mobility in both WCDMA and E-UTRAN could be broadly classified into three main categories:

(1) Intra-frequency mobility (idle and connected modes);

(2) Inter-frequency mobility (idle and connected modes); and (3) Inter-RAT mobility (idle and connected modes).

In intra-frequency mobility a UE moves between the cells belonging to the same carrier frequency. This is the most important mobility scenario since it involves less cost in terms of delay due. In addition, an operator would have at least one carrier at its disposal that it would like it to be efficiently utilized.

In inter-frequency mobility the UE moves between cells belonging to different carrier frequencies but of the same access technology. This could be considered as the second most important scenario.

In inter-RAT mobility the UE moves between cells that belong to different access technologies such as between WCDMA and GSM or vice versa.

The cell reselection is mainly a UE autonomous function without the intervention of its serving cell. But to some extent the UE behaviour in this mobility scenario could still be controlled by some broadcasted system parameters and performance specification. The UE in idle mode operates in discontinuous reception (DRX) state with long DRX cycle, e.g., 1.28 second. The DRX ensures power saving but it also adversely affects the measurement performance. Typically UE does measurement at the paging occasions (i.e. at the wake instances at the end of DRX cycle, e.g., once every 1.28 second). Therefore, measurement sampling rate in idle mode is considerably low compared to the connected mode scenario. Due to this reason measurement performance in idle mode becomes much coarser than that would be achievable in connected mode.

The cell reselection procedure in the UE is controlled via several parameters, whose values are signalled by the network or defined in the standard.

As mentioned in the above section that UE in idle mode performs measurements typically at DRX occasions. Thus the measurement period called Tmeasure is considerably longer compared to that in connected mode.

Furthermore in order to save the battery the UE starts measuring the neighbour cells only when the serving cell quality or signal strength falls below certain threshold called Search during certain number of DRX cycles called Nserv. The parameter Search is signalled by the network via broadcast channel in each cell. The parameter Nsery is specified in the standard but may also be signalled by the network.

A UE reselects a new neighbour cell provided it becomes stronger than the serving cell by certain margin called Qhyst over certain time period called Treselection. The parameters Qhyst and Treselection are signal and time hysteresis respectively; both are controlled by the network.

In addition all the above mentioned parameters are specific to one carrier frequency or radio access technology, e.g. WCDMA, GSM. This means if network deploys more than one carrier frequency or radio access technologies then multiple set of cell reselection parameters are signalled.

The above section described only the parameters, which are more relevant to this Solution.

The standard allows UE speeds up to 350 km/hr; this is possible in a high speed train scenario, for example. The UE should be able to reselect cell regardless of its speed up to 350 km/hr. This requires that a UE be able to perform cell reselection evaluation at faster rate at higher speed levels.

The WCDMA system provides support for high mobility state. To realize high mobility state, the parameter "Treselection", i.e. time hysteresis, can be scaled as a function of speed. The scaling is enforced by the network by signalling a parameter called "speed-dependent scaling factor". The speed, in turn, is measured in terms of the number of cell reselection, i.e., cell change.

In case of E-UTRAN, a procedure similar to the one used in WCDMA is possible. However, there is on going discussion to further improve the speed-dependent cell reselection procedure as described below.

Cell Reselection Evaluation Processes

Figure 1:
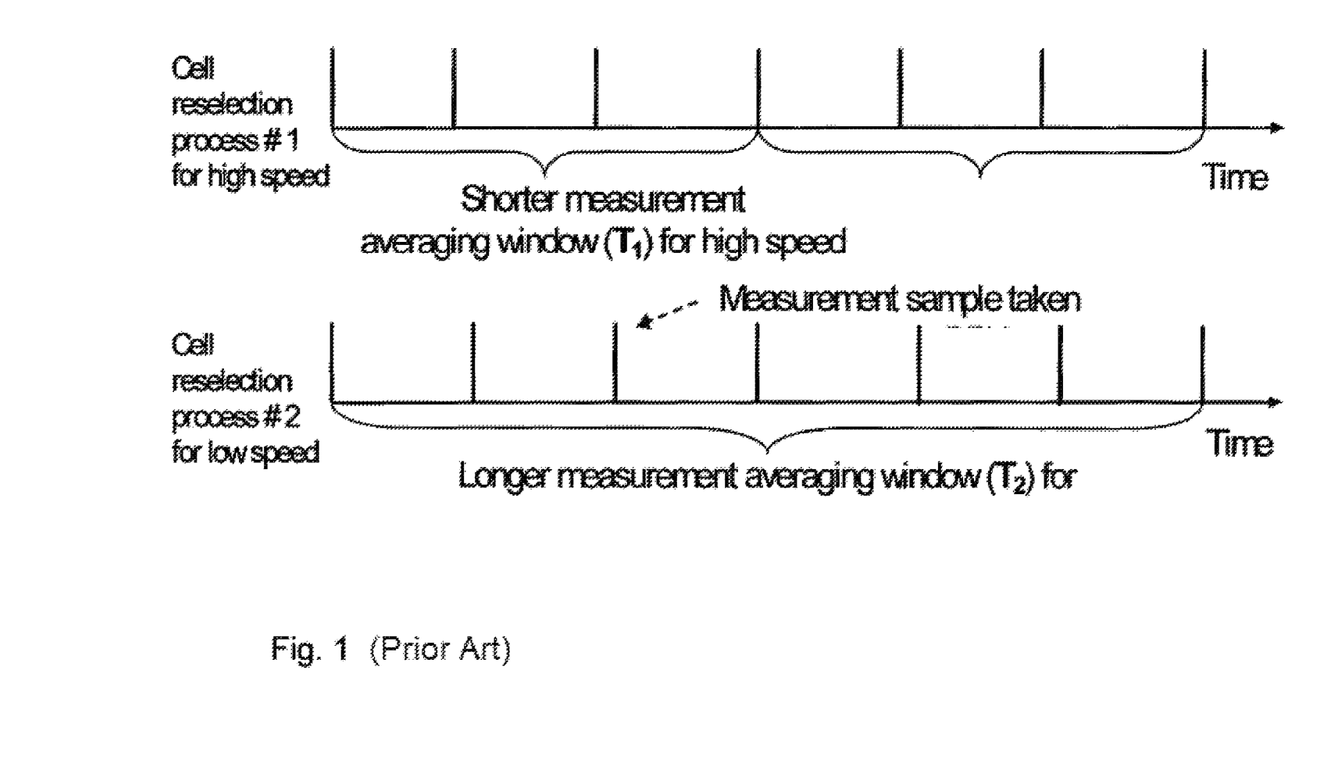
FIG. 1 is a diagrammatic view of an illustration of two parallel, low and high speed cell reselection evaluation processes with shorter and longer time averaging window according to prior art.

In order to realize speed-dependent cell reselection, the UE may perform two simultaneous cell reselection evaluation processes with two different set of values of the cell reselection parameters. In a very simple implementation the UE may perform filtering of the measurements used for cell reselection over two different time windows as shown in FIG. 1. FIG. 1 is an illustration of two parallel, low and high speeds, cell reselection evaluation processes with respective longer and shorter time averaging windows. The same measurement samples are used for both filterings. The shorter time averaging would cater for higher speed at which the fading rate is higher. The longer time averaging would cater for lower speed at which the fading rate is relatively lower. The UE has to employ two independent measurement filtering and cell reselection evaluation processes running simultaneously. This mechanism can be generalized to multiple speed levels e.g. low, medium and high. In the multiple speeds case there can be three parallel or simultaneous filtering with three different time averaging windows.

In a basic arrangement the multiple parallel cell reselections could be distinguished by different time average windows used for averaging the downlink measurements. However it is also possible that UE uses different values of other cell reselection parameters in the parallel cell reselection evaluation processes. For instance different values of Treselection (time hysteresis), Qhyst (signal hysteresis) and Search could be used for different evaluations in parallel.

Handover Evaluation Processes

Handover, as opposed to cell reselection, is fully controlled by the network through explicit UE specific commands and by performance specification. Handover is performed for the UE in connected mode. In connected mode the UE regularly performs measurements on neighbour cells. The network configures the UE to report events associated with mobility when certain conditions are fulfilled, e.g., when neighbour cell becomes stronger than the serving cell by some margin, i.e. hysteresis, over certain time, i.e., time hysteresis. The UE reports events and/or measurement report to the network, which in turn makes an appropriate decision, e.g. sends a handover command to the UE. Typical connected mode mobility parameters are a layer-3 or higher layer filtering coefficient, for additional time domain filtering, time to trigger i.e. time hysteresis, and hysteresis for signal.

In connected mode a high mobility state is not supported in WCDMA or in E-UTRAN. However, the methodology based on multiple parallel cell reselection evaluation processes can also be used in connected mode. To realize multiple parallel handover evaluation processes to support multiple mobility states in connected mode the typical parameters involved are the layer-3 coefficient, time to trigger (TTT), and hysteresis. It should be noted that layer-3 coefficient, TTT and hysteresis in connected mode are analogous to Tmeasure, Treselection (time hysteresis) and Qhyst (signal hysteresis) in idle mode respectively.

The conventional technology, e.g., existing solutions, as afore described, have problems. The scheme based on multiple parallel cell reselection or handover evaluation processes to realize different UE mobility states (e.g. low, medium, high, etc.) are attractive, but the multiple parallel cell reselection or handover evaluation processes in the UE does involve complexity. The UE has to process, keep track, and store the corresponding measurement results for all multiple processes running in parallel.

In addition, due to shorter time window needed for high mobility state detection, in idle mode or in connected mode when DRX is used the UE power consumption will slightly increase.

SUMMARY

It is therefore an object of the present invention to provide a mechanism that simplifies and facilitates mobility procedures such as cell reselection evaluation and handover procedure.

According to a first aspect of the present invention, the object is achieved by a method in a base station for configuring a wireless terminal for performing a cell reselection or handover evaluation process "evaluation process". The base station is comprised in a radio access network and is configured to communicate with the wireless terminal over an air interface. The wireless terminal is arranged to perform multiple evaluation processes parallel to each other. The multiple evaluation processes are governed by different set of mobility parameters. The base station establishes a mobility state of the wireless terminal such as e.g. the speed of the wireless terminal movement. Based on the determined mobility state of the wireless terminal, the base station determines whether or not the multiple parallel evaluation processes governed by different set of mobility parameters, shall be used by the wireless terminal. The base station then signals an identifier to the wireless terminal. This identifier identifies the determined whether or not the multiple parallel evaluation processes shall be configured to be used by the wireless terminal for evaluating cell reselection or handover.

According to a second aspect of the present invention, the object is achieved by a method in a wireless terminal for being configured by a base station for performing a cell reselection or handover evaluation process "evaluation process". The base station is comprised in a radio access network. The wireless terminal is configured to communicate with the base station over an air interface. The wireless terminal is arranged to perform multiple evaluation processes parallel to each other. The multiple evaluation processes are governed by different set of mobility parameters. The wireless terminal receives an identifier from the base station. The identifier identifies whether or not the multiple parallel evaluation processes shall be configured to be used by the wireless terminal for evaluating cell reselection or handover. Whether or not using the multiple parallel evaluation processes was determined by the base station based on a mobility state of the wireless terminal, which mobility state was established by the base station. The wireless terminal then configures to use the evaluation process according to the received identifier for performing an evaluation process.

According to a third aspect of the present invention, the object is achieved by a base station arranged to configure a wireless terminal for performing a cell reselection or handover evaluation process "evaluation process". The base station is comprised in a radio access network and is configured to communicate with the wireless terminal over an air interface. The wireless terminal is arranged to perform multiple evaluation processes parallel to each other. The multiple evaluation processes are governed by different set of mobility parameters. The base station comprises an evaluation process selector configured to establish a mobility state of the wireless terminal. The evaluation process selector is further configured to determine whether or not the multiple parallel evaluation processes shall be used by the wireless terminal based on the determined mobility state of the wireless terminal. The base station further comprises a transceiver configured to signal an identifier to the wireless terminal. The identifier identifies the determined whether or not the multiple parallel evaluation processes shall be configured to be used by the wireless terminal for evaluating cell reselection or handover.

According to a fourth aspect of the present invention, the object is achieved by a wireless terminal arranged to be configured by a base station for performing a cell reselection or handover evaluation process "evaluation process". The base station is comprised in a radio access network. The wireless terminal is configured to communicate with the base station over an air interface. The wireless terminal is further arranged to perform multiple evaluation processes parallel to each other, which multiple evaluation processes are governed by different set of mobility parameters. The wireless terminal comprises a transceiver configured to receive an identifier from the base station. The identifier identifies whether or not the multiple parallel evaluation processes shall be configured to be used by the wireless terminal for evaluating cell reselection or handover. Whether or not using the multiple parallel evaluation processes has been determined by the base station based on a mobility state of the wireless terminal being established by the base station. The wireless terminal further comprises a processor arranged to configure the wireless terminal to use the evaluation process according to the received identifier for performing an evaluation process.

Since the base station determines whether or not the multiple parallel evaluation processes shall be used by the wireless terminal based on the determined mobility state of the wireless terminal, and signals this to the wireless terminal, the wireless terminal only performs the more complex and power consuming multiple parallel evaluation process in the scenarios where the speed of the wireless terminal is less deterministic and where there could be large variation of the speed of the wireless terminal. This in turn results in that a mechanism is provided simplifying and facilitating mobility procedures such as cell reselection evaluation and handover procedure.

An advantage of the present solution is that the power consumption of the wireless terminal is reduced.

A further advantage of the present solution is that the wireless terminal does not have to perform parallel evaluation of cell reselection or handover in all the scenarios leading to less complexity.

A further advantage of the present solution is that the wireless terminal implementation can be simplified since multiple cell reselection and handover evaluation processes are not always activated rather are used only in typical scenarios.

A yet further advantage of the present solution is that the parallel evaluation is beneficial but there is also risk of incorrect triggering for instance due to measurement errors. Thus parallel evaluation should be performed only when it is necessary. The present solution ensures that the parallel evaluation is used in the most relevant scenario, thus leading to overall improvement in the system performance.

BRIEF DESCRIPTION OF THE DRAWINGS

The invention is described in more detail with reference to attached drawings illustrating exemplary embodiments of the invention and in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks labelled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In accordance with the technology described herein, i.e., the present technology, the type of cell reselection process/handover process to be activated depends on the deployment scenario in order to reduce wireless terminal complexity and save wireless terminal power. The present technology comprises signalling mechanisms and the use thereof to enable scenario-based activation of the cell reselection evaluation processes. It should be appreciated that the concepts described herein, when referring to "cell reselection" or "handover", equally apply to the other, unless specially excepted or understood to the contrary from the context.

Figure 2:
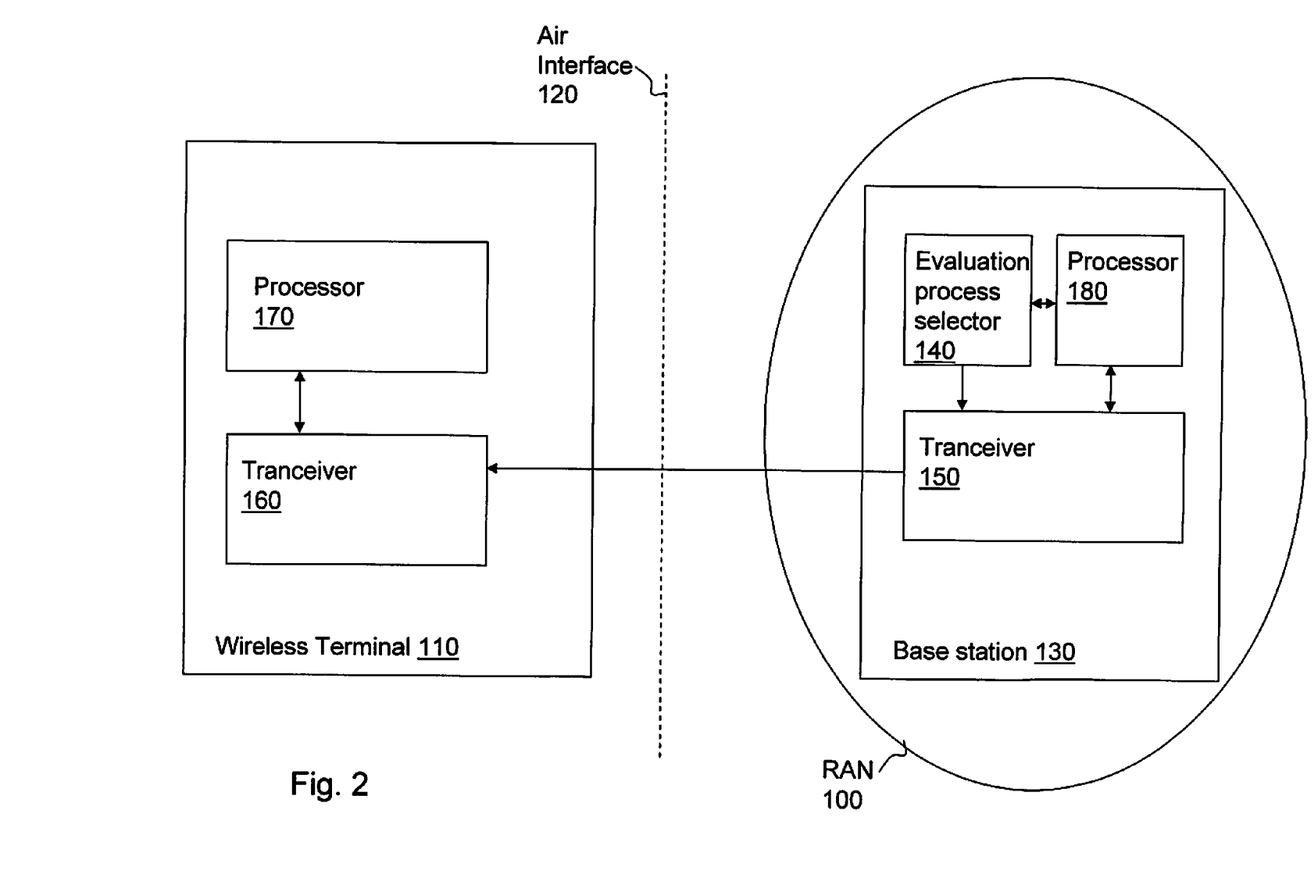
FIG. 2 is a schematic block diagram illustrating embodiments of a wireless telecommunication system wherein a wireless terminal communicates with a base station in a radio access network.

FIG. 2 shows an exemplary radio access network (RAN) 100 with which a user equipment unit, from now on referred to as the wireless terminal 110, communicates over an air interface 120. The radio access network 100 covers a geographical area which is divided into cell areas, with each cell area being served by a base station, such as base station 130 shown in FIG. 2. The base station 130 is a Radio Base Station, which in some networks is related to as "NodeB" or base transceiver station or access point.

The radio access network 100 and the wireless terminal 110 are comprised in a wireless telecommunication system, such as e.g. the E-UTRAN or LTE, LTE-Adv, 3rd Generation Partnership Project (3GPP) WCDMA system, 3GPP UTRAN TDD, Global System for Mobile communications/Enhanced Data rate for GSM Evolution (GSM/EDGE), Wideband Code Division Multiple Access (WCDMA), 3GPP2 cdma2000, 3GPP2 high rate packet data (HRPD), Worldwide Interoperability for Microwave Access (WiMax), or Ultra Mobile Broadband (UMB). The wireless terminal 110 may be a mobile station or a user equipment unit such as a mobile telephone also known as a "cellular" telephone, and a laptop with wireless capability, e.g., mobile termination, and thus can be, for example, portable, pocket, hand-held, computer-included, or a car-mounted mobile device which communicate voice and/or data with radio access network.

There are several scenarios where cell reselection or handover based on high or even medium speed mobility state is not needed. For instance, in small indoor cells, home base stations, etc., only cell reselection based on low speed mobility state or default mobility state is sufficient. On the other hand, in a high speed train or tunnel scenario only the high speed mobility state is sufficient. But in macro or even micro cells, which are typically deployed in urban suburbs or in rural areas both low and high mobility states are desirable to support pedestrian mobile terminals and vehicular mobile terminals, respectively. To adapt the multiple parallel cell reselection evaluation processes (e.g., time averaging over different windows) to the deployment scenario of the wireless terminal 110, cell size, etc., the base station 130 comprises the functionality of evaluation process selector 140. The evaluation process selector 140 may serve to determine the number and/or type of evaluation processes which are suitable for the wireless terminal 110, i.e. that the wireless terminal 110 shall use, depending on the deployment circumstances or scenario of that wireless terminal 110. The evaluation process selector 140 develops an indication, i.e. an identifier, of which evaluation processes are selected by evaluation process selector 140 as being appropriate for the wireless terminal 110, and forwards such identifier or indication to a transceiver 150 or the like which sends the identifier or indication to a transceiver 160 in the wireless terminal 110 over the air interface 120. When the wireless terminal 110 is in the idle mode the identifier/indication may be sent to the wireless terminal 110 over a broadcast channel. When the wireless terminal 110 is in the connected mode the identifier or indication may be sent to the wireless terminal 110 over a wireless terminal-specific channel. The evaluation process selector 140 may take various forms, such as a controller or processor as those terms are herein expansively described. Moreover, in some types of radio access networks the evaluation process selector 140 may be located in a base station node or the like along with the transceiver 150, while in other types of radio access networks the evaluation process selector 140 may be located in another node, such as in a radio network controller (RNC), for example.

Activation or Deactivation of Multiple Parallel Cell Reselection Evaluation Processes The wireless terminal 110 is configured to perform multiple parallel cell reselection evaluation according to the corresponding set of mobility parameters such as Time average window, Treselection, Qhyst, time hysteresis, signal hysteresis etc., with different values. The values of these parameters are set according to the different mobility states of the wireless terminal 110, which generally occur in typical scenarios.

Furthermore, the parameter settings may also be dependent on the DRX cycle, e.g., longer time averaging for longer DRX to save power consumption of the wireless terminal 110. The parameters may e.g. be signalled via system information or are specified in the standard.

In an example embodiment, typically there will be three set of parameters corresponding to low, medium, and high speed levels for which the cell reselection is to be evaluated by the wireless terminal 100 in parallel. The low speed level implying that the wireless terminal 110 moves with a speed up to about 100 km/h, the medium speed level implying that the wireless terminal 110 moves with a speed between 50 km/h and 250 km/h and the high speed level implying that the wireless terminal 110 moves with a speed between about 150 km/h and 400 km/h. In a simple arrangement there may be only two parallel evaluations to support low and high mobility state speed. Whereas the state of the art requires that the wireless terminal 110 all the time performs parallel evaluations regardless of the scenario, the present solution determines the number and/or type of cell reselection/handover evaluations dependent upon a deployment scenario.

Impact of Deployment Scenario on Evaluation of Cell Reselection or Handover.

In small cells an evaluation corresponding to a low wireless terminal speed, e.g., comprising long time averaging, is likely to be sufficient. Examples of deployment comprising small cells include an indoor environment (e.g. shopping centre, train stations, airport), home base stations, etc. In such "small" environments it is redundant for the wireless terminal 110 to perform cell reselection evaluations corresponding to medium or high mobility states.

An extreme scenario may appear when the wireless terminal 110 is located in high speed train or high speed subway. In this scenario, the wireless terminal 110 is served by the base station 130 being deployed along a railway track. Since a train typically runs at a well defined speed, the base station 130 serving the wireless terminal 110 inside the train is fully aware of the speed levels, experienced by serving wireless terminals in the train. In such a predictable environment it is sufficient that an evaluation be done according to a high mobility state and possibly medium mobility state. On the other hand, if the base station 130 is situated very close to major railway stations, where a train is likely to run at low speed, would still require the wireless terminal 110 when being on board the train to do evaluation according to lower speed levels.

In urban centres or city outskirts, the actual speed of the wireless terminal 110 is quite unpredictable. The speed is lower if the wireless terminal 110 is held by a pedestrian. On the other hand, the speed of the wireless terminal 110 may be higher if the subscriber is riding on a bus or driving a car. The speed of the wireless terminal 110 may also change in an unpredictable manner. Suppose, for example, the wireless terminal 110 being held by a pedestrian, that enters a car and starts driving it, or vice versa. Thus, in such scenario it is worthwhile that the wireless terminal 110 performs all possible evaluation in parallel.

The present solution thus comprises configuring the wireless terminal 110 to perform only those parallel cell reselection or handover evaluation processes, which are necessary in a given scenario.

Establishing Mobility State and Selecting Evaluation Process

The mobility state of the wireless terminal 110 is established by the base station 130 by determining the environment in which the wireless terminal 110 operates.

For instance in small cells the mobility state is low. Thus the base station 130 should signal an identifier to the wireless terminal 110 enabling it to select one set of pre-configured mobility parameters corresponding to low speed.

In cells located close to major high ways and railway tracks, the wireless terminal 110 mobility state is considered high. Thus the base station 130 should signal an identifier to the wireless terminal 110 enabling it to select one set of pre-configured mobility parameters corresponding to high speed.

In major cities or in the centre of city the mobility state can either be determined as medium or both low and medium. In the latter case parallel evaluation processes corresponding to low and medium should be activated. Thus the base station 130 should signal an identifier to the wireless terminal 110 enabling it to select 2 sets of pre-configured mobility parameters corresponding to low speed and medium speed.

The base station 130 can also use statistical data of the speed of the wireless terminals operating in a given environment to predict typical mobility state(s) of wireless terminal operating in the said environment. The statistical data can be obtained by measuring the actual speed of the mobile terminal 110 in the base station 130 by using one or more state of the art techniques such as by measuring wireless terminal Doppler speed or rate of handovers.

Signalling Mechanism to Enable Scenario Based Cell Reselection Evaluation

In an exemplary scenario, the wireless terminal 110 is in the state of idle mode wherein cell reselection evaluation is to be performed.

In one example embodiment, only one bit of information is sent from the base station 130 to the wireless terminal 110 via a broadcast channel in a cell to indicate whether the wireless terminal 110 should perform only normal cell reselection evaluation according to some default or normal cell reselection parameters, or to invoke multiple parallel cell reselection evaluation processes.

In another example embodiment, only one bit of information is sent from the base station to the wireless terminal 110 via a broadcast channel in a cell to indicate whether the wireless terminal 110 should perform cell reselection evaluation according to cell reselection parameters for low speed, or to invoke multiple parallel cell reselection evaluation processes.

In another example embodiment, the base station 130 performs multilevel signalling from to the wireless terminal 110 via a broadcast channel to indicate which sub-set of parallel evaluations should be done. Multilevel signalling is needed if more than 2 mobility states are specified. In that case multiple level signalling would comprise of 2 or more bits of information. Assuming three mobility states (low, medium, and high), there can be seven possibilities (low only, medium only, high only, low/medium, low/high, medium/high, low/medium/high). Thus, in this example, the multilevel signalling comprises three bits, which are needed to activate the evaluation processes corresponding to the mobility state(s), which are likely to occur in a given scenario.

Yet in another example embodiment the multilevel signalling from the base station 130 also provides means to enable the wireless terminal 110 to activate or deactivate some default or normal configuration for cell reselection evaluation in addition to other sub-set of parallel evaluations. Considering, as an example, the previous example comprising three mobility states (low, medium, and high), the multilevel signalling should enable eight possible configurations requiring three bits of information. The configurations are: default/ normal, low only, medium only, high only, low/medium, low/high, medium/high and low/medium/high.

Signalling Mechanism to Enable Scenario Based Handover Evaluation

In another exemplary scenario the wireless terminal 110 is in the state of connected mode, wherein cell reselection evaluation is to be performed.

The basic principle of signalling mechanism described under "Signalling mechanism to enable scenario based cell reselection evaluation" for activating and deactivating various combinations of cell reselection evaluation processes according to deployment scenario are highly equally applicable in connected mode. In connected mode the wireless terminal 110 instead performs parallel handover evaluation processes and uses different sets of handover-related parameters for parallel evaluations. The main difference is that in connected mode the signalling will be sent via a wireless terminal specific channel e.g., a dedicated control channel, which is a logical channel carrying wireless terminal specific control information. The Dedicated Control CHannel (DCCH) may be mapped on to a Dedicated CHannel (DCH), Forward Access CHannel (FACH), or High Speed Downlink Shared CHannel (HS-DSCH) in WCDMA. In E-UTRAN it may be mapped on to physical downlink shared channel (PDSCH).

The present solution thus comprises and embraces a method in a radio network node such as a base station 130, as well as an apparatus including such node, of signalling to the wireless terminal 110, an identifier which identifies a sub-set of parallel cell reselection or handover evaluation processes, which are governed by different set of mobility parameters and corresponding to different wireless terminal mobility states to be performed by the wireless terminal 110 in a cell in a given deployment scenario.

The present solution may further comprise a situation in which one of the sub-sets corresponds to default or normal set of mobility parameters.

The present solution may further comprise signalling one bit to enable the wireless terminal 110 to perform only one cell reselection or handover process according to the said default or normal parameters or to perform parallel multiple cell reselections or handover processes.

Figure 3:
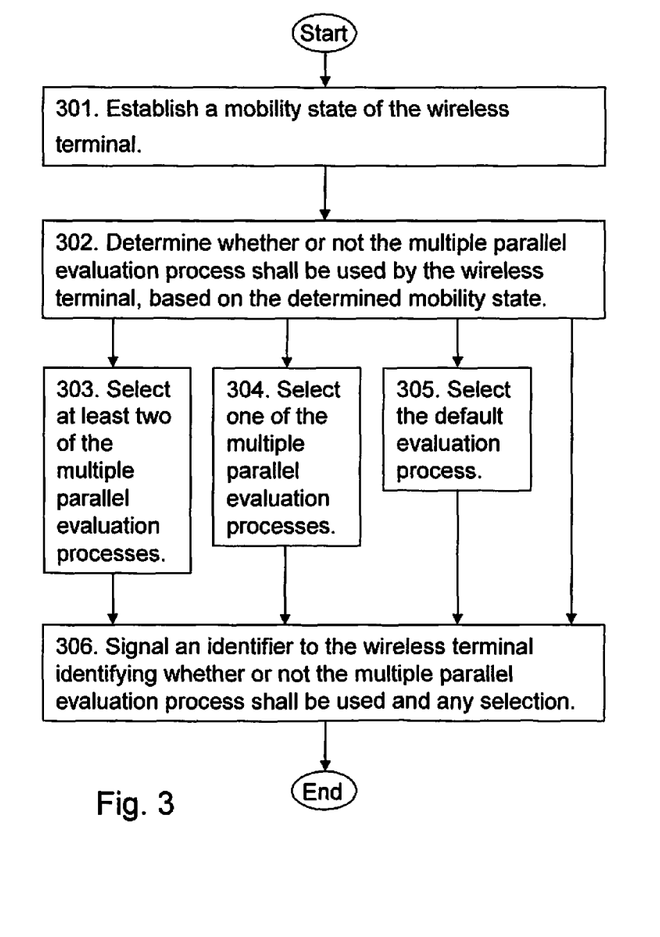
FIG. 3 is a flow chart illustrating embodiments of a method in a base station.

The method steps in the base station 130 for configuring a wireless terminal 110 for performing a cell reselection or handover evaluation process "evaluation process", according to some embodiments will now be described with reference to a flowchart depicted in FIG. 3. As mentioned above, the base station 130 is comprised in the radio access network 100 and is configured to communicate with the wireless terminal 110 over an air interface 120. The wireless terminal 110 is arranged to perform multiple evaluation processes parallel to each other. The multiple evaluation processes are governed by different set of mobility parameters. In some embodiments the mobility parameters are e.g. any one or more of time average window, Treselection, Qhyst, time hysteresis and/or signal hysteresis.

In some embodiments, the multiple parallel evaluation processes comprises a first evaluation process associated to low speed of the wireless terminal 110, a second evaluation process associated to medium speed of the wireless terminal 110, and/or a third evaluation process associated to high speed of the wireless terminal 110.

The method comprises the steps of:

Step 301

The base station 130 establishes a mobility state of the wireless terminal 110.

In some embodiments, each of the multiple parallel evaluation processes may be associated with respective speeds that the wireless terminal 110 moves with. In these embodiments, this step to establish a mobility state is performed by establishing the speed that the wireless terminal 110 moves with.

Step 302

The base station 130 determines whether or not the multiple parallel evaluation processes governed by different set of mobility parameters shall be used by the wireless terminal 110 based on the determined mobility state of the wireless terminal 110 in step 301. The mobility state may be determined by the scenario in which the wireless terminal 110 is operating. For instance in high speed train environment the mobility state of the wireless terminal 110 can be considered to be 'high'. But in sub-urban areas the mobility states of the wireless terminal may comprise of both low and medium.

Step 303

This is an optional step. The base station 130 may when it is determined that the multiple parallel evaluation processes shall be used by the wireless terminal 110, select at least two of the multiple parallel evaluation processes based on the mobility state of the wireless terminal 110 determined in step 301. Each of the selected processes comprises one or more mobility parameters that shall be used by the wireless terminal 110.

Step 304

This is an optional step. The base station 130 may, when it is determined that the multiple parallel evaluation processes shall not be used by the wireless terminal 110, select one of the multiple parallel evaluation processes based on the mobility state of the wireless terminal 110 determined in step 301. The selected process comprises one or more mobility parameters that shall be used by the wireless terminal 110.

Step 305

This is an optional step to be performed in embodiments wherein the wireless terminal 110 further is configured to perform a default cell reselection or handover evaluation process, which default evaluation process is governed by one set of default mobility parameters. The base station 130 may, when it is determined that the multiple parallel evaluation processes shall not be used by the wireless terminal 110, select the default evaluation process when said default process shall be used by the wireless terminal 110, based on the determined mobility state of the wireless terminal 110.

Step 306

The base station 130 then signals an identifier to the wireless terminal 110. The identifier identifies the determined whether or not the multiple parallel evaluation processes shall be configured to be used by the wireless terminal 110 for evaluating cell reselection or handover.

When optional step 303 is performed, the identifier may further identify the least two selected parallel evaluation processes that shall be used by the wireless terminal 110 for evaluating cell reselection or handover.

When optional step 304 is performed, the identifier may further identify the selected one of the parallel evaluation processes that shall be used by the wireless terminal 110 for evaluating cell reselection or handover.

When optional step 304 is performed, the identifier may further identify the selected default evaluation process that shall be used by the wireless terminal 110 for evaluating cell reselection or handover.

The method may be performed for evaluating cell reselection, wherein the wireless terminal 110 is in idle mode. In this case, the identifier may be signalled to the wireless terminal 110 via a broadcast channel.

The method may be performed for evaluating handover, wherein the wireless terminal 110 is in connected mode. In this case the identifier may be signalled to the wireless terminal 110 via a wireless terminal specific channel.

The base station 130, arranged to perform the method steps above to configure a wireless terminal 110 for performing a cell reselection or handover evaluation process "evaluation process", will now be described referring again to FIG. 2. As mentioned above the base station 130 is comprised in the radio access network 100 and is configured to communicate with the wireless terminal 110 over the air interface 120. The wireless terminal 110 is arranged to perform multiple evaluation processes parallel to each other. The multiple evaluation processes are governed by different set of mobility parameters. The mobility parameters may e.g. be any one or more of time average window, Treselection, Qhyst, time hysteresis and/or signal hysteresis.

In some embodiments, each of the multiple parallel evaluation processes is associated with respective speeds that the wireless terminal 110 moves with. For example, the multiple parallel evaluation processes may comprise a first evaluation process associated to low speed of the wireless terminal 110, a second evaluation process associated to medium speed of the wireless terminal 110, and/or a third evaluation process associated to high speed of the wireless terminal 110.

The wireless terminal 110 may further be configured to perform a default cell reselection or handover evaluation process. The default evaluation process is governed by one set of default mobility parameters.

The base station 130 comprises the evaluation process selector 140 configured to establish a mobility state of the wireless terminal 110. In some embodiments, the evaluation process selector 140 may further be configured to establish the mobility state of the wireless terminal 110 by establishing the speed that the wireless terminal 110 moves with.

The evaluation process selector 140 is further configured to determine whether or not the multiple parallel evaluation processes shall be used by the wireless terminal 110 based on the determined mobility state of the wireless terminal 110.

The evaluation process selector 140 may further be configured to select at least two of the multiple parallel evaluation processes, when it is determined that the multiple parallel evaluation processes shall be used by used by the wireless terminal 110. The selection is based on the determined mobility state of the wireless terminal 110. Each of the selected processes comprises one or more mobility parameters that shall be used by the wireless terminal 110.

The evaluation process selector 140 may further be configured to select one of the multiple parallel evaluation processes, when it is determined that the multiple parallel evaluation processes shall not be used by the wireless terminal 110. The selection is based on the determined mobility state of the wireless terminal 110. The selected process comprises one or more mobility parameters that shall be used by the wireless terminal 110.

The evaluation process selector 140 may further be configured to select the default evaluation process when said default process shall be used by the wireless terminal 110. The selection is based on the determined mobility state of the wireless terminal 110 and when it is determined that the multiple parallel evaluation processes shall not be used by the wireless terminal 110.

The base station 130 further comprises the transceiver 150 configured to signal an identifier to the wireless terminal 110. The identifier identifies the determined whether or not the multiple parallel evaluation processes shall be configured to be used by the wireless terminal 110 for evaluating cell reselection or handover.

The transceiver 150 may further be configured to signal the identifier to the wireless terminal 110 via a broadcast channel or via a wireless terminal specific channel.

In one scenario wherein it is determined that the multiple parallel evaluation processes shall be used, the identifier may further be configured to identify the least two selected parallel evaluation processes that shall be used by wireless terminal 110 for evaluating cell reselection or handover.

In another scenario wherein it is determined that the multiple parallel evaluation processes shall not be used, the identifier may further be configured to identify which one of the selected parallel evaluation process that shall be used by wireless terminal 110 for evaluating cell reselection or handover.

In yet another scenario wherein it is determined that the multiple parallel evaluation processes shall not be used, the identifier may further be configured to identify the selected default evaluation process that shall be used by wireless terminal 110 for evaluating cell reselection or handover.

Figure 4:
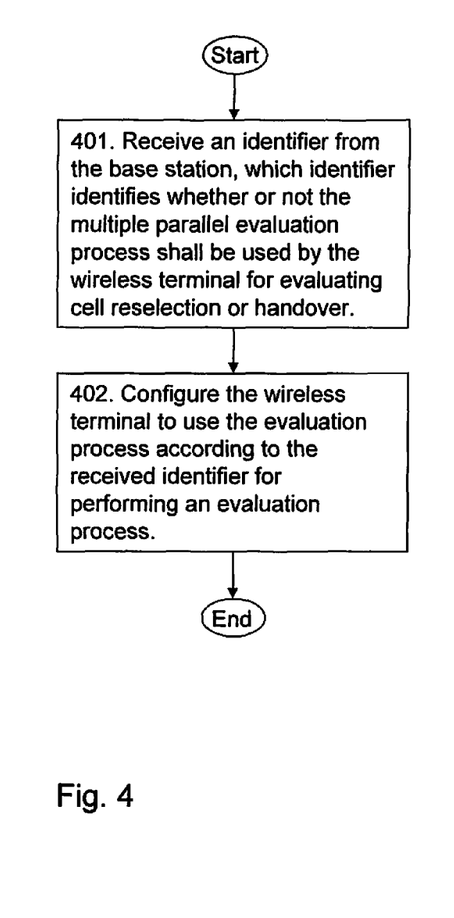
FIG. 4 is a flow chart illustrating embodiments of a method in a wireless terminal.

The method steps in the wireless terminal 110, for being configured by the base station 130 for performing a cell reselection or handover evaluation process "evaluation process", according to some embodiments, will now be described with reference to a flowchart depicted in FIG. 4. As mentioned above the base station 130 is comprised in the radio access network 100. The wireless terminal 110 is configured to communicate with the base station 130 over the air interface 120. The wireless terminal 110 is arranged to perform multiple evaluation processes parallel to each other, which multiple evaluation processes are governed by different set of mobility parameters. The mobility parameters may e.g. be any one or more of time average window, Treselection, Qhyst, time hysteresis and/or signal hysteresis.

In some embodiments, each of the multiple parallel evaluation processes is associated with respective speeds that the wireless terminal 110 moves with.

The multiple parallel evaluation processes may comprise a first evaluation process associated to low speed of the wireless terminal 110, a second evaluation process associated to medium speed of the wireless terminal 110, and/or a third evaluation process associated to high speed of the wireless terminal 110. The mobility state of the wireless terminal 110 may be established by the base station 130 by establishing the speed that the wireless terminal 110 moves with.

In some embodiments the wireless terminal 110 may further be configured to perform a default cell reselection or handover evaluation process. The default evaluation process is governed by one set of default mobility parameters.

The method comprises the steps of:

Step 401

The wireless terminal 110 receives an identifier from the base station 130. The identifier identifies whether or not the multiple parallel evaluation processes shall be configured to be used by the wireless terminal 110 for evaluating cell reselection or handover. Whether or not to use the multiple parallel evaluation processes has been determined by the base station 130 based on a mobility state of the wireless terminal 110, which mobility state has been established by the base station 130.

The identifier may further identify which at least two parallel evaluation processes that shall be used by wireless terminal 110 for evaluating cell reselection or handover, when the identifier identifies that the multiple parallel evaluation processes shall be used by the terminal 110. This function may be used when at least two identified parallel evaluation processes was selected by the base station 130 based on the mobility state of the wireless terminal 110, which mobility state was established by the base station 130. The at least two identified parallel evaluation processes each comprises one or more mobility parameters that shall be used by the wireless terminal 110.

The identifier may further identify one of the multiple parallel evaluation processes that shall be used by wireless terminal 110 for evaluating cell reselection or handover, in cases when the identifier identifies that the multiple parallel evaluation processes shall not be used by the wireless terminal 110. This function may be used when this single identified evaluation process was selected by the base station 130, based on the mobility state of the wireless terminal 110, which mobility state was established by the base station 130. The identified evaluation process comprises one or more mobility parameters that shall be used by the wireless terminal 110 for evaluating cell reselection or handover.

The identifier may further identify that the default evaluation process shall be used by wireless terminal 110 for evaluating cell reselection or handover, in cases where the identifier identifies that the multiple parallel evaluation processes shall not be used by the wireless terminal 110. This function may be used when the identified default evaluation processes has been selected by the base station 130, based on the mobility state of the wireless terminal 110, which mobility state has been established by the base station 130.

Step 402

The wireless terminal 110 then configures the wireless terminal 110 to use the evaluation process according to the received identifier for performing an evaluation process.

The present method may be performed for evaluating cell reselection, wherein the wireless terminal 110 is in idle mode. In this case the identifier may be received from the base station 130 via a broadcast channel.

The present method may also be performed for evaluating handover, wherein the wireless terminal 110 is in connected mode. In this case the identifier may be received from the base station 130 via a wireless terminal specific channel.

The wireless terminal 110, arranged to perform the method steps above to be configured by a base station 130 for performing a cell reselection or handover evaluation process "evaluation process", will now be described referring again to FIG. 2. As mentioned above, the base station 130 is comprised in the radio access network 100. The wireless terminal 110 is configured to communicate with the base station 130 over the air interface 120. The wireless terminal 110 is arranged to perform multiple evaluation processes parallel to each other. The multiple evaluation processes are governed by different set of mobility parameters.

In some embodiments, the wireless terminal 110 may further be arranged to perform a default cell reselection or handover evaluation process. The default evaluation process is governed by one set of default mobility parameters.

In some embodiments, each of the multiple parallel evaluation processes is associated with respective speeds that the wireless terminal 110 moves with. In these embodiments the multiple parallel evaluation processes may comprise a first evaluation process associated to low speed of the wireless terminal 110, a second evaluation process associated to medium speed of the wireless terminal 110, and/or a third evaluation process associated to high speed of the wireless terminal 110.

The mobility parameters may be any one or more of time average window, Treselection, Qhyst, time hysteresis and/or signal hysteresis.

The wireless terminal 110 comprises the transceiver 160 configured to receive an identifier from the base station 130. The identifier identifies whether or not the multiple parallel evaluation processes shall be configured to be used by the wireless terminal 110 for evaluating cell reselection or handover. Whether or not to use the multiple parallel evaluation processes has been determined by the base station 130 based on a mobility state of the wireless terminal 110, which mobility state has been established by the base station 130. The mobility state of the wireless terminal 110 may be established by the base station 130 by establishing the speed that the wireless terminal 110 moves with.

The identifier may further identify which at least two parallel evaluation processes that shall be used by wireless terminal 110 for evaluating cell reselection or handover, when the identifier identifies that the multiple parallel evaluation processes shall be used by the terminal 110. This function may be used when at least two identified parallel evaluation processes was selected by the base station 130 based on the mobility state of the wireless terminal 110, which mobility state was established by the base station 130. The at least two identified parallel evaluation processes each comprises one or more mobility parameters that shall be used by the wireless terminal 110.

The identifier may further identify one of the multiple parallel evaluation processes that shall be used by wireless terminal 110 for evaluating cell reselection or handover, in cases when the identifier identifies that the multiple parallel evaluation processes shall not be used by the wireless terminal 110. This function may be used when this single identified evaluation process was selected by the base station 130, based on the mobility state of the wireless terminal 110, which mobility state was established by the base station 130. The identified evaluation process comprises one or more mobility parameters that shall be used by the wireless terminal 110 for evaluating cell reselection or handover.

The identifier may further identify that the default evaluation process shall be used by wireless terminal 110 for evaluating cell reselection or handover, in cases where the identifier identifies that the multiple parallel evaluation processes shall not be used by the wireless terminal 110. This function may be used when the identified default evaluation processes has been selected by the base station 130 based on the mobility state of the wireless terminal 110, which mobility state has been established by the base station 130.

The transceiver 150 may further be configured to receive the identifier from the base station 130 via a broadcast channel or a wireless terminal specific channel.

The wireless terminal 110 further comprises the processor 170 arranged to configure the wireless terminal 110 to use the evaluation process according to the received identifier for performing an evaluation process.

The present mechanism for configuring a wireless terminal 110 for performing a cell reselection or handover evaluation process "evaluation process", may be implemented through one or more processors, such as a processor 180 in the base station 130 or the processor 170 in the wireless terminal 110 depicted in FIG. 2, together with computer program code for performing the functions of the present solution. The program code mentioned above may also be provided as a computer program product, for instance in the form of a data carrier carrying computer program code for performing the present solution when being loaded into the base station 130 or the wireless terminal 110. One such carrier may be in the form of a CD ROM disc. It is however feasible with other data carriers such as a memory stick. The computer program code can furthermore be provided as pure program code on a server and downloaded to the base station 130 or the wireless terminal 110 remotely.

In one of its aspect the present technology concerns a method in a radio network node, i.e. the base station 130, of signalling, to the user equipment, i.e. the wireless terminal 110, an identifier which identifies a sub-set of parallel cell reselection or handover evaluation processes, which are governed by different set of mobility parameters and corresponding to different user equipment mobility states to be performed by the user equipment, i.e. the wireless terminal 110, in a cell in a given deployment scenario. In another of its aspects the technology concerns equipment, e.g., a radio access network (RAN) and a node of a radio access network (RAN), configured and suited for carrying out such method.

The technology further may comprise or include a situation in which one of the sub-sets corresponds to default or normal set of mobility parameters. The technology further comprises or includes signalling one bit to enable the user equipment to perform only one cell reselection or handover process according to the said default or normal parameters or to perform parallel multiple cell reselections or handover processes.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for configuring a wireless terminal for performing a cell reselection or handover evaluation process, the base station comprised in a radio access network and configured to communicate with the wireless terminal over an air interface, the wireless terminal arranged to perform multiple evaluation processes in parallel that are governed by different sets of mobility parameters, the method comprising:
    establishing a mobility state of the wireless terminal, wherein said establishing comprises establishing the speed with which the wireless terminal moves,
    determining, based on the established mobility state of the wireless terminal, whether or not the terminal shall perform any of the multiple evaluation processes in parallel for evaluating cell reselection or handover, wherein the multiple evaluation processes are associated with respective speeds that the wireless terminal moves with,
    if determined that the wireless terminal shall perform at least some of the multiple evaluation processes in parallel:
        selecting at least two of the multiple evaluation processes based on the established mobility state of the wireless terminal, each of the selected processes comprising one or more mobility parameters that shall be used by the wireless terminal; and
        signaling an identifier to the wireless terminal that indicates said determination to the terminal and that identifies the at least two selected evaluation processes; and
    if determined that the wireless terminal shall not perform any of the multiple evaluation processes in parallel:
        selecting one of the multiple evaluation processes based on the established mobility state of the wireless terminal, the selected process comprising one or more mobility parameters that shall be used by the wireless terminal; and
        signaling an identifier to the wireless terminal that indicates said determination to the terminal and that identifies the selected one of the multiple evaluation processes.

2. The method of claim 1, wherein the wireless terminal is further configured to perform a default cell reselection or handover evaluation process that is governed by one set of default mobility parameters, wherein the method further comprises, if determined that the wireless terminal shall not perform any of the multiple evaluation processes in parallel, selecting the default evaluation process based on the established mobility state of the wireless terminal, and wherein the identifier further identifies the selected default evaluation process.

3. The method of claim 1, wherein the multiple evaluation processes comprise at least one of a first evaluation process associated with low speed of the wireless terminal, a second evaluation process associated with medium speed of the wireless terminal, and a third evaluation process associated with high speed of the wireless terminal.

4. The method of claim 1, wherein the mobility parameters are any one or more of time average window, Treselection, Qhyst, time hysteresis and signal hysteresis.

5. The method of claim 1, wherein the method configures a wireless terminal for performing a cell reselection evaluation process, wherein the wireless terminal is in idle mode, and wherein the identifier is signaled to the wireless terminal via a broadcast channel.

6. The method of claim 1, wherein the method configures a wireless terminal for performing a handover evaluation process, wherein the wireless terminal is in connected mode, and wherein the identifier is signaled to the wireless terminal via a wireless terminal specific channel.

7. The method of claim 1, wherein said determining comprises determining that the terminal shall perform at least some of the multiple evaluation processes in parallel when multiple mobility states of the terminal are established, and determining that the terminal shall not perform any of the multiple evaluation processes in parallel when only a single mobility state of the terminal is established.

8. A method in a wireless terminal for being configured by a base station to perform a cell reselection or handover evaluation process, the base station comprised in a radio access network, the wireless terminal configured to communicate with the base station over an air interface and arranged to perform multiple evaluation processes in parallel that are governed by different sets of mobility parameters, the method comprising:
    receiving an identifier from the base station that identifies whether or not the wireless terminal shall perform any of the multiple evaluation processes in parallel for evaluating cell reselection or handover, as determined by the base station based on a mobility state of the wireless terminal, wherein the multiple evaluation processes are associated with respective speeds that the wireless terminal moves with, and wherein the mobility state of the wireless terminal was established by the base station by establishing the speed with which the wireless terminal moves,
    wherein when the identifier indicates that the wireless terminal shall perform at least some of the multiple evaluation processes in parallel, the identifier further identifies at least two of the multiple evaluation processes that the wireless terminal shall perform for evaluating cell reselection or handover, the at least two evaluation processes having been selected by the base station based on the mobility state of the wireless terminal, and each comprising one or more mobility parameters that shall be used by the wireless terminal;

wherein when the identifier indicates that the wireless terminal shall not perform any of the multiple evaluation processes in parallel, the identifier further identifies one of the multiple evaluation processes that the wireless terminal shall perform for evaluating cell reselection or handover, the identified evaluation process having been selected by the base station based on the mobility state of the wireless terminal and comprising one or more mobility parameters that shall be used by the wireless terminal for evaluating cell reselection or handover, and configuring the wireless terminal to perform one or more of the evaluation processes for evaluating cell reselection or handover according to the received identifier.

9. The method of claim 8, wherein the wireless terminal is further configured to perform a default cell reselection or handover evaluation process that is governed by one set of default mobility parameters, wherein the identifier indicates that the wireless terminal shall not perform any of the multiple evaluation processes in parallel, and wherein the identifier further identifies that the wireless terminal shall perform the default evaluation process for evaluating cell reselection or handover, the default evaluation process having been selected by the base station, based on the mobility state of the wireless terminal.

10. The method of claim 8, wherein the multiple evaluation processes comprise at least one of a first evaluation process associated with low speed of the wireless terminal, a second evaluation process associated with medium speed of the wireless terminal, and a third evaluation process associated with high speed of the wireless terminal.

11. The method of claim 8, wherein the mobility parameters are any one or more of time average window, Treselection, Qhyst, time hysteresis and signal hysteresis.

12. The method of claim 8, wherein the method is performed for evaluating cell reselection, wherein the wireless terminal is in idle mode, and wherein the identifier is received from the base station via a broadcast channel.

13. The method of claim 8, wherein the method is performed for evaluating handover, wherein the wireless terminal is in connected mode, and wherein the identifier is received from the base station via a wireless terminal specific channel.

14. The method of claim 8, wherein the identifier indicates that the terminal shall perform at least some of the multiple evaluation processes in parallel when the terminal has multiple mobility states, and indicates that the terminal shall not perform any of the multiple evaluation processes in parallel when the terminal has only a single mobility state.

15. A base station arranged to configure a wireless terminal for performing a cell reselection, or handover, evaluation process, the base station comprised in a radio access network and configured to communicate with the wireless terminal over an air interface, the wireless terminal arranged to perform multiple evaluation processes in parallel that are governed by different sets of mobility parameters, the base station comprising:

an evaluation process selector circuit configured to:

establish a mobility state of the wireless terminal by establishing the speed with which the wireless terminal moves, determine, based on the established mobility state of the wireless terminal, whether or not the terminal shall perform any of the multiple evaluation processes in parallel for evaluating cell reselection or handover, wherein the multiple evaluation processes are associated with respective speeds that the wireless terminal moves with, if determined that the wireless terminal shall perform at least some of the multiple evaluation processes in parallel, select at least two of the multiple evaluation processes based on the established mobility state of the wireless terminal, each of the selected processes comprising one or more mobility parameters that shall be used by the wireless terminal, and if determined that the wireless terminal shall not perform any of the multiple evaluation processes in parallel, select one of the multiple evaluation processes based on the established mobility state of the wireless terminal, the selected process comprising one or more mobility parameters that shall be used by the wireless terminal, and a transceiver configured to signal an identifier to the wireless terminal that indicates said determination to the terminal and that further identifies which one or more of the multiple evaluation processes is selected by the evaluation process selector circuit.

16. The base station of claim 15, wherein the wireless terminal is further configured to perform a default cell reselection or handover evaluation process that is governed by one set of default mobility parameters, wherein the evaluation process selector circuit is further configured to, if determined that the wireless terminal shall not perform any of the multiple evaluation processes in parallel, select the default evaluation process based on the established mobility state of the wireless terminal, and wherein the identifier further identifies the selected default evaluation process.

17. The base station of claim 15, wherein the multiple parallel evaluation processes comprise at least one of a first evaluation process associated with low speed of the wireless terminal, a second evaluation process associated with medium speed of the wireless terminal, and a third evaluation process associated with high speed of the wireless terminal.

18. The base station of claim 15, wherein the mobility parameters are any one or more of time average window, Treselection, Qhyst, time hysteresis and signal hysteresis.

19. The base station of claim 15, wherein the transceiver is further configured to signal the identifier to the wireless terminal via a broadcast channel or via a wireless terminal specific channel.

20. The base station of claim 15, wherein the evaluation process selector circuit is configured to determine that the terminal shall perform at least some of the multiple evaluation processes in parallel when multiple mobility states of the terminal are established, and determine that the terminal shall not perform any of the multiple evaluation processes in parallel when only a single mobility state of the terminal is established.

21. A wireless terminal arranged to be configured by a base station for performing a cell reselection, or handover, evaluation process, the base station comprised in a radio access network, the wireless terminal configured to communicate with the base station over an air interface and arranged to perform multiple evaluation processes in parallel that are governed by different sets of mobility parameters, the wireless terminal comprising:

a transceiver configured to receive an identifier from the base station that indicates whether or not the wireless terminal shall perform any of the multiple evaluation processes in parallel for evaluating cell reselection or handover, as determined by the base station based on a mobility state of the wireless terminal, wherein the multiple evaluation processes are associated with respective speeds that the wireless terminal moves with, and wherein the mobility state of the wireless terminal was established by the base station by establishing the speed with which the wireless terminal moves, wherein when the identifier indicates that the wireless terminal shall perform at least some of the multiple evaluation processes in parallel, the identifier further identifies at least two of the multiple evaluation processes that the wireless terminal shall perform for evaluating cell reselection or handover, the at least two evaluation processes having been selected by the base station based on the mobility state of the wireless terminal, and each comprising one or more mobility parameters that shall be used by the wireless terminal;

wherein when the identifier indicates that the wireless terminal shall not perform any of the multiple evaluation processes in parallel, the identifier further identifies one of the multiple evaluation processes that the wireless terminal shall perform for evaluating cell reselection or handover, the identified evaluation process having been selected by the base station based on the mobility state of the wireless terminal and comprising one or more mobility parameters that shall be used by the wireless terminal for evaluating cell reselection or handover, and a processor arranged to configure the wireless terminal to perform one or more of the evaluation processes for evaluating cell reselection or handover according to the received identifier.

22. The wireless terminal of claim 21,
wherein the wireless terminal is further configured to perform a default cell reselection or handover evaluation process that is governed by one set of default mobility parameters,
wherein the identifier indicates that the wireless terminal shall not perform any of the multiple evaluation processes in parallel, and
wherein the identifier further identifies that the wireless terminal shall perform the default evaluation process for evaluating cell reselection or handover, the default evaluation process having been selected by the base station, based on the mobility state of the wireless terminal.

23. The wireless terminal of claim 21, wherein the multiple evaluation processes comprise at least one of a first evaluation process associated with low speed of the wireless terminal, a second evaluation process associated with medium speed of the wireless terminal, and a third evaluation process associated with high speed of the wireless terminal.

24. The wireless terminal of claim 21, wherein the mobility parameters are any one or more of time average window, Treselection, Qhyst, time hysteresis and signal hysteresis.

25. The wireless terminal of claim 21, wherein the transceiver further is configured to receive the identifier from the base station via a broadcast channel or a wireless terminal specific channel.

26. The wireless terminal of claim 21, wherein the identifier indicates that the terminal shall perform at least some of the multiple evaluation processes in parallel when the terminal has multiple mobility states, and indicates that the terminal shall not perform any of the multiple evaluation processes in parallel when the terminal has only a single mobility state.

* * * * *

UNITED STATES PATENT AND TRADEMARK OFFICE
CERTIFICATE OF CORRECTION

| | | |
|---|---|---|
| PATENT NO. | : 8,649,790 B2 | Page 1 of 1 |
| APPLICATION NO. | : 12/989697 | |
| DATED | : February 11, 2014 | |
| INVENTOR(S) | : Kazmi | |

It is certified that error appears in the above-identified patent and that said Letters Patent is hereby corrected as shown below:

In the Drawings

In Fig. 2, Sheet 2 of 3, in Box "160", in Line 1, delete "Tranceiver" and insert -- Transceiver --, therefor.

In Fig. 2, Sheet 2 of 3, in Box "150", in Line 1, delete "Tranceiver" and insert -- Transceiver --, therefor.

In the Specification

In Column 3, Line 35, delete "Nsery" and insert -- Nserv --, therefor.

In Column 9, Line 9, delete "wireless terminal 100" and insert -- wireless terminal 110 --, therefor.

Signed and Sealed this
Twenty-second Day of July, 2014

Michelle K. Lee
*Deputy Director of the United States Patent and Trademark Office*